US010386182B2

(12) United States Patent
Pelletier et al.

(10) Patent No.: US 10,386,182 B2
(45) Date of Patent: Aug. 20, 2019

(54) CARBON FIBER COMPOSITE LEVEL AND METHOD OF MANUFACTURING SAME

(71) Applicant: STANLEY BLACK & DECKER, INC., New Britain, CT (US)

(72) Inventors: Thomas Pelletier, Wallingford, CT (US); Aliaksei Chernyshou, Farmington, CT (US); Christopher Woolley, Rocky Hill, CT (US); Johannes Komulainen, Joensuu (FI); Juha Honkanen, Joensuu (FI)

(73) Assignee: STANLEY BLACK & DECKER, INC., New Britain, CT (US)

( * ) Notice: Subject to any disclaimer, the term of this patent is extended or adjusted under 35 U.S.C. 154(b) by 300 days.

(21) Appl. No.: 15/454,627

(22) Filed: Mar. 9, 2017

(65) Prior Publication Data

US 2017/0184398 A1 Jun. 29, 2017

Related U.S. Application Data

(63) Continuation of application No. 14/665,401, filed on Mar. 23, 2015, now Pat. No. 9,625,260.

(60) Provisional application No. 61/980,387, filed on Apr. 16, 2014.

(51) Int. Cl.
*G01C 9/26* (2006.01)
*G01C 9/34* (2006.01)
*G01C 25/00* (2006.01)

(52) U.S. Cl.
CPC ................ *G01C 9/26* (2013.01); *G01C 9/34* (2013.01); *G01C 25/00* (2013.01)

(58) Field of Classification Search
CPC .................................. G01C 9/26; G01C 9/28
USPC .................................................. 33/379, 381
See application file for complete search history.

(56) References Cited

U.S. PATENT DOCUMENTS

| | | | | |
|---|---|---|---|---|
| 4,492,038 | A * | 1/1985 | Mayes | G01C 9/34 33/379 |
| 5,749,152 | A * | 5/1998 | Goss | G01C 9/24 33/377 |
| 6,381,859 | B1 * | 5/2002 | Wedemeyer | G01C 9/26 33/365 |
| 6,499,226 | B1 | 12/2002 | Reda et al. | |
| 6,675,490 | B1 | 1/2004 | Krehel et al. | |
| 7,464,479 | B2 | 12/2008 | Tran | |
| 7,484,307 | B2 | 2/2009 | Abrecht | |
| 7,509,749 | B1 | 3/2009 | Stefanko | |
| 7,765,706 | B2 | 8/2010 | Scheyer | |
| 7,779,545 | B2 | 8/2010 | Kallabis | |
| 7,802,372 | B1 | 9/2010 | Silberberg | |

(Continued)

*Primary Examiner* — George B Bennett

(74) *Attorney, Agent, or Firm* — Pillsbury Winthrop Shaw Pittman LLP

(57) ABSTRACT

A level comprising a level body, and at least one bubble vial mounted on the level body is provided. The level body has a generally tubular configuration including a top wall and a bottom wall generally parallel to one another, and a pair of spaced side walls; a top opening in the level body that interrupts at least a portion of the top wall to accommodate the at least one bubble vial; and an internal support structure disposed within the tubular configuration of the level body and spanning longitudinally along the level body so as to be disposed on both sides of the top opening to provide structural support to the level body in the vicinity of the top opening.

7 Claims, 11 Drawing Sheets

(56) References Cited

U.S. PATENT DOCUMENTS

| | | | | |
|---|---|---|---|---|
| 8,109,005 | B2 | 2/2012 | Hudson et al. | |
| 9,170,104 | B2 | 10/2015 | Henry et al. | |
| 9,625,260 | B2 * | 4/2017 | Pelletier | G01C 9/34 |
| 2002/0095812 | A1 * | 7/2002 | Newman | B25H 7/04 33/613 |
| 2002/0129509 | A1 | 9/2002 | Evans | |
| 2004/0143981 | A1 * | 7/2004 | Krehel | G01C 9/26 33/382 |
| 2005/0144796 | A1 * | 7/2005 | Szumer | G01C 9/28 33/379 |
| 2005/0229413 | A1 | 10/2005 | Foran | |
| 2005/0229416 | A1 * | 10/2005 | Kim | G01C 9/28 33/451 |
| 2006/0123644 | A1 | 6/2006 | Szumer et al. | |
| 2007/0234483 | A1 | 10/2007 | Kunz et al. | |
| 2008/0216332 | A1 | 9/2008 | Steffens et al. | |
| 2008/0222907 | A1 | 9/2008 | Silberberg | |
| 2011/0113638 | A1 * | 5/2011 | Scheyer | G01C 9/28 33/379 |
| 2012/0134736 | A1 * | 5/2012 | Ryan | B43K 19/02 401/52 |
| 2013/0192075 | A1 | 8/2013 | Sanchez | |
| 2015/0059195 | A1 | 3/2015 | De Coi et al. | |
| 2015/0168143 | A1 | 6/2015 | Henry et al. | |
| 2015/0300819 | A1 | 10/2015 | Pelletier et al. | |
| 2016/0054124 | A1 | 2/2016 | Schaefer | |
| 2016/0116279 | A1 | 4/2016 | Lin et al. | |
| 2016/0138916 | A1 | 5/2016 | Neitzell et al. | |
| 2016/0138918 | A1 * | 5/2016 | Neitzell | G01C 9/34 33/381 |
| 2017/0322026 | A1 * | 11/2017 | Gray | G01C 9/26 |
| 2018/0094925 | A1 * | 4/2018 | Mackey | G01C 9/26 |
| 2018/0292207 | A1 * | 10/2018 | Wojciechowski | G01C 9/28 |
| 2018/0364041 | A1 * | 12/2018 | Rice | G01C 9/28 |

* cited by examiner

CARBON FIBER COMPOSITE LEVEL AND METHOD OF MANUFACTURING SAME

CROSS-REFERENCE TO RELATED APPLICATION

This application is a continuation of U.S. patent application Ser. No. 14/665,401, filed on Mar. 23, 2015, now allowed, which claims priority to U.S. Provisional Application No. 61/980,387, filed on Apr. 16, 2014. The contents of each of these applications are incorporated herein by reference in their entirety.

FIELD OF THE INVENTION

The present invention relates to levels and more particularly to composite levels and methods for manufacturing the same.

BACKGROUND OF THE INVENTION

Levels are normally used in the construction or home improvement industry to determine an angular orientation of a surface against which the level is placed or aligned. Levels of various sizes and shapes are available and are typically manufactured using an aluminum extrusion and fiber glass molding process. It is desirable for a level to be strong and durable, yet light weight and easy to handle. The present invention provides an improvement in the level and in the method of manufacturing the same.

SUMMARY OF THE INVENTION

One aspect of the present patent application provides a level made from a carbon fiber composite material. In one embodiment, the level comprises a level body having a fiber glass layer and a carbon fiber layer. At least one bubble vial is mounted on the level body. The fiber glass layer may comprise a glass-mat material or a glass fabric material. The carbon fiber layer may be present in an amount from between 10% to 90% by volume in the level body. In one embodiment, the level body comprises between about 12%-15% by volume the carbon fiber layer.

In another embodiment, the level body comprises two fiber glass layers and a carbon fiber layer. One fiber glass layer may comprise a glass-mat material and a second fiber glass layer may comprise a glass fabric layer. The carbon fiber layer may be disposed between the two fiber glass layers.

In yet another embodiment, the level includes an internal support structure. the level body may have a generally tubular configuration including a top wall and a bottom wall generally parallel to one another, and a pair of spaced side walls; a top opening in the level body that interrupts at least a portion of the top wall to accommodate the at least one bubble vial; and an internal support structure disposed within the tubular configuration of the body and spanning longitudinally along the body so as to be disposed on both sides of the top opening to provide structural support to the body in the vicinity of the top opening. The internal support structure may comprise high impact ABS.

Another aspect of the present patent application provides a method to manufacture a level. In one embodiment, the method comprises forming a level body through a pultrusion process wherein the level body comprises a fiber glass layer and a carbon fiber layer and mounting at least one bubble vial on the level body. The pultrusion process comprises saturating fiber glass and carbon fiber with resin and pressing the fiber glass/resin material and carbon fiber/resin material into a shape for the level body. The fiber glass layer may comprise a glass-mat material or a glass fabric material. The carbon fiber layer may be present in an amount from between 10% to 90% by volume in the level body. In one embodiment, the level body comprises between about 12%-15% by volume the carbon fiber layer.

In another embodiment, the method comprises forming a level body having two fiber glass layers and a carbon fiber layer. One fiber glass layer may comprise a glass-mat material and a second fiber glass layer may comprise a glass fabric layer. The carbon fiber layer may be disposed between the two fiber glass layers.

In yet another embodiment, the method comprises providing an internal support structure disposed within the level body. The method comprises forming the level body into a generally tubular configuration including a top wall and a bottom wall generally parallel to one another, and a pair of spaced side walls. The method further comprises cutting a top opening in the level body that interrupts at least a portion of the top wall to accommodate the at least one bubble vial. The method further comprises providing an internal support structure disposed within the tubular configuration of the body and spanning longitudinally along the body so as to be disposed on both sides of the top opening to provide structural support to the body in the vicinity of the top opening.

In yet another embodiment, a level includes a level body; and at least one bubble vial mounted on the level body. The level body has a generally tubular configuration including a top wall and a bottom wall generally parallel to one another, and a pair of spaced side walls; a top opening in the level body that interrupts at least a portion of the top wall to accommodate the at least one bubble vial; and an internal support structure disposed within the tubular configuration of the level body and spanning longitudinally along the level body so as to be disposed on both sides of the top opening to provide structural support to the level body in the vicinity of the top opening.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE ILLUSTRATED EMBODIMENT(S)

Figures 1A, 1B, 1C, 1D:
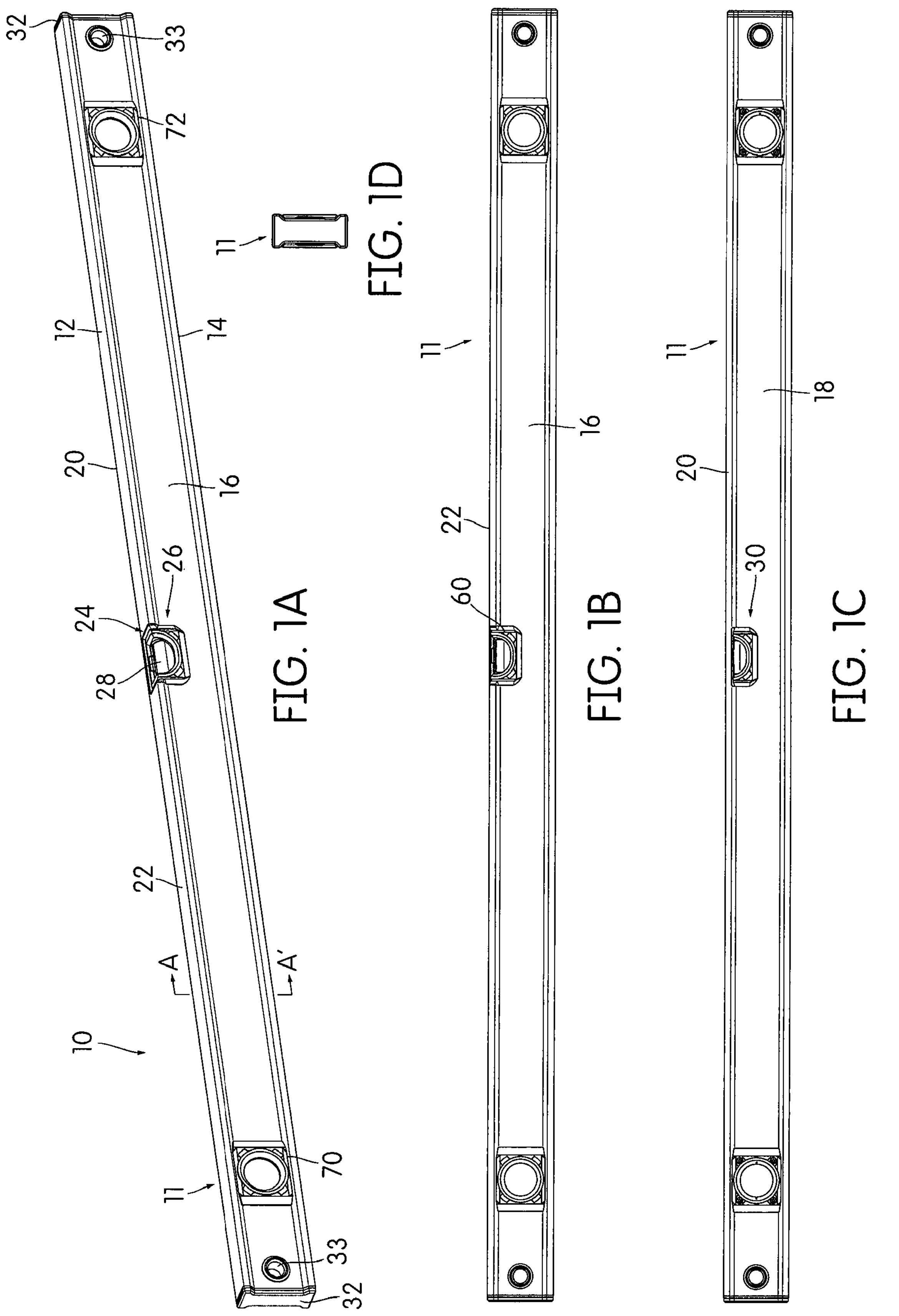
FIG. 1A is a perspective view of a level according to an embodiment of the invention.
FIG. 1B is a side view of the level shown in FIG. 1A.
FIG. 1C is a side view of the opposite side of the level shown in FIG. 1B.
FIG. 1D is an end view of the level shown in FIG. 1A.

Referring now more particularly to the drawings, FIGS. 1A-D show the general layout of a level 10 according to an embodiment of the invention. The level 10 has an elongated body 11 that comprises an upper wall 12 and a lower wall 14 that is generally parallel to the upper wall 12. A first side wall 16 is generally perpendicular to the upper 12 and lower 14 walls, and a second side wall 18 is also generally perpendicular to the upper 12 and lower 14 walls. The sidewalls 16 and 18 are spaced from one another and generally parallel to one another. Each of the walls 12, 14, 16, and 18 generally extend longitudinally from end to end of the body 11 of the level 10, although they may be discontinuous in certain areas to accommodate various components mounted to the body. End cap 32 may be secured using eyelet assembly 33 at the ends of the body 11 for protection against impact and/or ease of use. The end cap 32 may be made of rubber, plastic, elastomer, wood, metal, or any other suitable material. As will be discussed in greater detail below, in one embodiment, level body 11 is made of a carbon fiber composite material and formed through a pultrusion process.

In one embodiment, the level 10 may be formed to a shape in accordance with the teachings of U.S. Pat. No. 7,484,307 ("the '307 patent"), hereby incorporated by reference. As shown in FIGS. 1A-D, the upper wall 12 has a top opening 24 therethrough at a generally central location, though it will be appreciated that the opening 24 may be at alternate locations along the upper wall 12. In one embodiment, as shown in the FIGS., the upper wall 12 can be provided with a first linear edge 20 that extends uninterruptedly from end to end of the body 11, while a second linear edge 22 is interrupted at the opening 24, as disclosed in the '307 patent. However, the present invention is not limited to such configuration and can include a top center vial that entirely disrupts the upper wall 12, just for example. As shown in the illustrated embodiment, the first linear edge 20 is disposed at an operative connection of the upper wall 12 and the second side wall 18. The second linear edge 22 is disposed at the operative connection between the upper wall 12 and the first side wall 16.

As shown, the first side wall 16 may have a side opening 26 that is contiguous with the top opening 24 in the upper wall 12. A bubble vial 28 is carried in a vial assembly 60 and installed in a cavity formed by the openings 24, 26 such that it may be used for leveling purposes. The bubble vial 28 may therefore be visible from a first direction, through the top opening 24 in the upper wall 12, and from a second direction orthogonal to the first, through the side opening 26 in the first side wall 16. In this manner, a level 10 is described that has an uninterrupted marking surface (edge 20) and a bubble vial 28 that is visible from at least two orthogonal directions.

In addition, in the illustrated embodiment, because the top opening 24 is contiguous with side opening 26, the bubble vial 28 can be viewed from a wide range of angles, without disruption. That is, the bubble vial 28 can be viewed through the top of the vial body (i.e., through top opening 24), and continuously through angles extending to the side opening 26 and beyond, so that the vial can be viewed at angles along an arc of at least 120° without any intervening opaque structure, such as an edge surface of the body.

As shown, a second side opening 30 is provided through the second side wall 18. The opening 30 in the second side wall 18 allows the bubble vial 28 to be visible from a third direction that is orthogonal to the first direction and opposite to the second direction, described above.

Figure 2A:
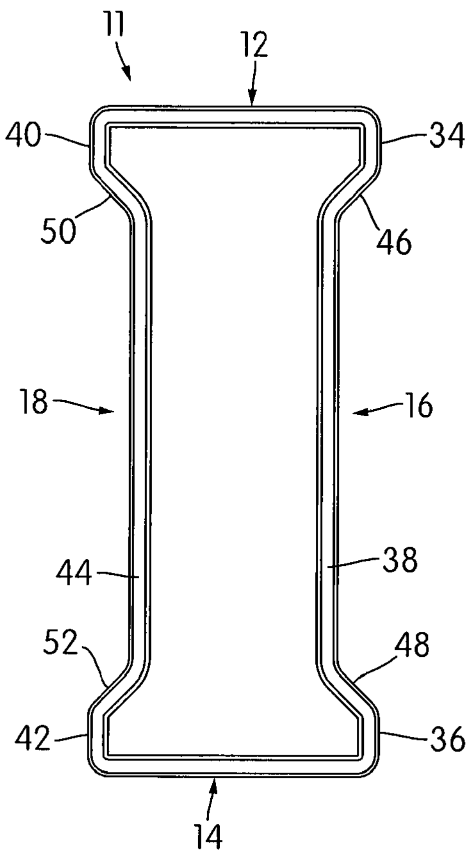
FIGS. 2A-B are an end view (with end cap removed) and a cross-sectional view (taken through the line A-A' in FIG. 1A), respectively.

Turning to FIG. 2A, an end view of level 10 with end cap 32 removed is shown. As shown, the level 10 may have a generally I-shaped box-beam type structure of the type described in the aforementioned U.S. Pat. No. 7,484,307. The first side wall 16 may have a first upper wall flange portion 34 that intersects with the upper wall 12, a first lower wall flange portion 36 that intersects with the lower wall 14, and a first main wall portion 38 extending between the first upper wall flange portion 34 and the first lower wall flange portion 36.

The second side wall 18 may similarly have a second upper wall flange portion 40 that intersects with the upper wall 12, a second lower wall flange portion 42 that intersects with the lower wall 14, and a second main wall portion 44 extending between the second upper wall flange portion 40 and the second lower wall flange portion 42.

As shown, the first main wall portion 38 is generally parallel to the second main wall portion 44. One of skill in the art will appreciate that the present invention is not limited to each of the main wall portions 38, 44 being parallel to each other. For example, the main wall portions 38, 44 may form a V-shaped cross-section with the distance between them being smaller at a region closer to the lower wall 14 than the distance between them at a region closer to the upper wall 12, or the main wall portions 38, 44 may form an inverted V-shaped cross-section. Moreover, the main wall portions 38, 44 may be curved or irregularly shaped such that any desirable cross-section may be achieved, such as a concave, convex, or ribbed configuration.

As shown, the first upper wall flange portion 34 is generally parallel to the second upper wall flange portion 40, and the first lower wall flange portion 36 is generally parallel to the second lower wall flange portion 42. One of ordinary skill in the art will appreciate that variations on the orientation of the wall flange portions may be made within the scope of the present invention.

The first side wall 16 may further comprise a first upper angled wall portion 46 and a first lower angled wall portion 48. The first upper angled wall portion 46 connects the first main wall portion 38 with the first upper wall flange portion 34 and the first lower angled wall portion 48 connects the first main wall portion 38 with the first lower wall flange portion 36. The second side wall 18 may likewise comprise a second upper angled wall portion 50 and a second lower angled wall portion 52. The second upper angled wall portion 50 connects the second main wall portion 44 with the second upper wall flange portion 40 and the second lower angled wall portion 52 connects the second main wall portion 44 with the second lower wall flange portion 42.

In one embodiment, the first 46 and second 50 upper angled wall portions and the first 48 and second 52 lower angled wall portions form angles of 90 degrees with respect to the first 38 and second 44 main wall portions. One skilled in the art will appreciate that the angled wall portions 46, 50, 48, 52, may form an angle with respect to the main wall portions 38, 44 in the range of greater than about 0 degrees to less than about 180 degrees.

In one embodiment, the level body 11 has a more traditional "box-beam" shape. In another embodiment, the level may be formed to a shape in accordance with the teachings of U.S. Pat. No. 6,675,490, hereby incorporated by reference, wherein the level has a generally I-shaped box-beam type structure similar to the structure described above, with one difference being the opening in the first side wall is not contiguous with the opening in the top wall. In yet another embodiment, the level may be formed to a shape in accordance with the teachings of U.S. Pat. App. Pub. 2013/0192075, hereby incorporated by reference, wherein the level body has a generally I-beam configuration.

Turning back to FIGS. 1A-D, the bubble vial 28 has a fixed calibrated orientation with respect to the lower wall 14. In the embodiment shown, the bubble vial 28 is oriented such that its longitudinal axis is substantially parallel to the lower wall 14. Accordingly, the lower wall 14 may be placed upon a horizontal surface and the bubble vial 28 may be referred to in order to determine whether the surface is level. The bubble 28 may also have a fixed calibrated orientation with respect to the top wall 12, so that the top wall 12 can be placed on a horizontal surface and the bubble vial 28 may be referred to in order to determine if the surface is level. As will be described in greater detail below, bubble vial 28 is secured in the level using a vial assembly 60.

Level 10 may include additional openings for other bubble vials. In one embodiment, vial assemblies 70 and 72 are secured into openings that may be provided through each of the main walls 38, 44 at locations within or on the body 11 of the level 10. In one embodiment, a bubble vial that has a longitudinal axis perpendicular to the lower wall may be provided in vial assembly 70 for a plumb determination. In this embodiment, the lower wall 14 or upper wall 12 may be placed against a vertical surface, and the bubble vial may be referred to in order to determine whether the vertical surface is plumb.

A further bubble vial may be provided at another location within or on the level body 10, such as vial assembly 72, in order to determine whether a surface is oriented at 45 degrees. For this purpose, the bubble vial may have a fixed orientation at 45 degrees with respect to the lower wall 14 and/or upper wall 12, so that such a determination may be made by placing the upper 12 or lower 14 wall against the surface being tested. One of ordinary skill in the art will appreciate that a bubble vial of any angular orientation with respect to the lower wall 14 may be installed in a level 10 in accordance with the present invention without departing from its scope. Moreover, a bubble vial may be provided that has a variable orientation such that a user may orient the vial at an angle suitable for a particular application and later change its angle as the situation requires.

Figure 2B:
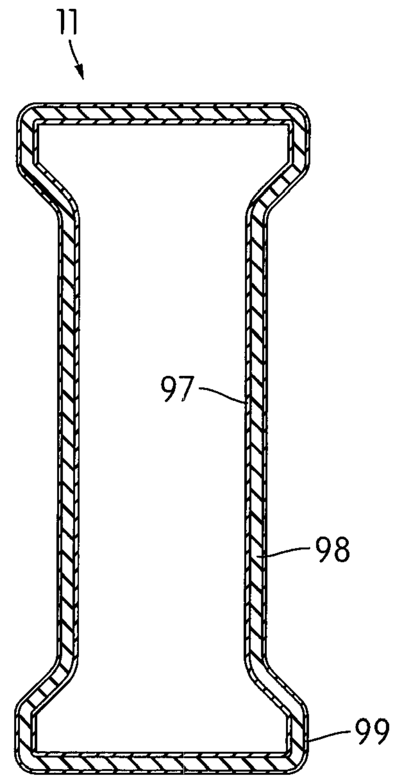

Turning to FIG. 2B, a cross-sectional view of level 10 taken along line A-A' in FIG. 1A shown. As shown, level body 11 has a three layer construction with an inner layer 97, middle layer 98, and outer layer 99. In one embodiment, level body 11 is made through pultrusion processes. Generally the pultrusion process involves first saturating a fiber material, such as fiber glass or carbon fiber, with a suitable resin. The resin may be a thermosetting or thermoplastic resin. In one embodiment, the resin is unsaturated polyester. The saturation process may be through various methods such as spraying, dipping, injecting, roll coating, or other comparable methods. After saturation of the fiber materials with the resin, the fiber/resin material is pulled into a die that shapes and cures the material into the shape of the desired pultruded article. The pultruded article may then cut to the appropriate size and further processed into the final product.

In one embodiment, inner layer 97 may include glass-mat, middle layer 98 may include carbon fiber 98, and outer layer 99 may include glass fabric. Glass-mat may be a sheet of nonwoven fiber glass filaments. Glass fabric may be a sheet of woven fiber glass filaments. Inner layer 97 and outer layer 99 may be other suitable fiber glass materials.

In one embodiment, the manufacturing process for a level body 11 is as follows. The fiber glass materials (glass-mat and glass fabric) and carbon fiber are first saturated with a resin such as unsaturated polyester. The resin saturated glass-mat, carbon fiber, and glass fabric material are fed into a die such that the glass-mat/resin material forms an inner layer, the carbon fiber/resin material forms a middle layer, and the glass fabric/resin material an outer layer. The die then molds the three layers into the desired shape, such as the generally I-shaped box beam described above, and cures the layers. The pultruded level body may be cut to the appropriate size to make levels of different sizes, such as 24", 48", 72", 78", and 96" levels. The level body may be further processed, such as cutting out openings for various inserts and other processing steps to form the final product.

In one embodiment, level body 11 may be made with two layers instead of three, specifically a fiber glass layer and a carbon fiber layer. The process for making a two layer level body is substantially the same as described above, except with only one fiber glass layer.

The amount of each material in each layer of the level body 11 may be varied. The carbon fiber layer 98 in the level body 11 may be from 10% to 99% by volume and the fiber glass layers 97, 99 combined may be from 1% to 90% by volume. Level body 11 may comprise 50% by volume fiber glass layers combined and 50% by volume carbon fiber layer, 60% by volume fiber glass layers combined and 40% by volume carbon fiber layer, 70% by volume fiber glass layers combined and 30% by volume carbon fiber layers, 80% by volume fiber glass layers combined and 20% by volume carbon fiber layer, or 90% by volume fiber glass layers combined and 10% by volume carbon fiber layer. In one embodiment, level body 11 comprises 85% by volume of the fiber glass layers 97, 99 combined and 15% by volume carbon fiber layer 98.

The amount of fiber glass materials (glass-mat and glass fabric) and carbon fiber may be varied based on need and in an amount that would still produce a level body 11 of suitable strength. While carbon fiber is stronger and lighter than the fiber glass materials, carbon fiber is also costlier. Consideration of factors such as strength, weight, and cost may aid in determining the amount of each material to be used in level body 11. The outer layer may also be chosen for suitability of further processing, such as painting, of the level body 11 to make the final level 10 product.

Applicants have found that manufacturing the level body 11 using the materials and methods described above provides a level 10 of sufficient strength, but at the same time, is lighter than comparable conventional levels made from other material, such as aluminum. In one embodiment, a 48" level made with a carbon fiber composite according to the method described above may be over 30% lighter than a comparable 48" level made with aluminum.

Figure 3:
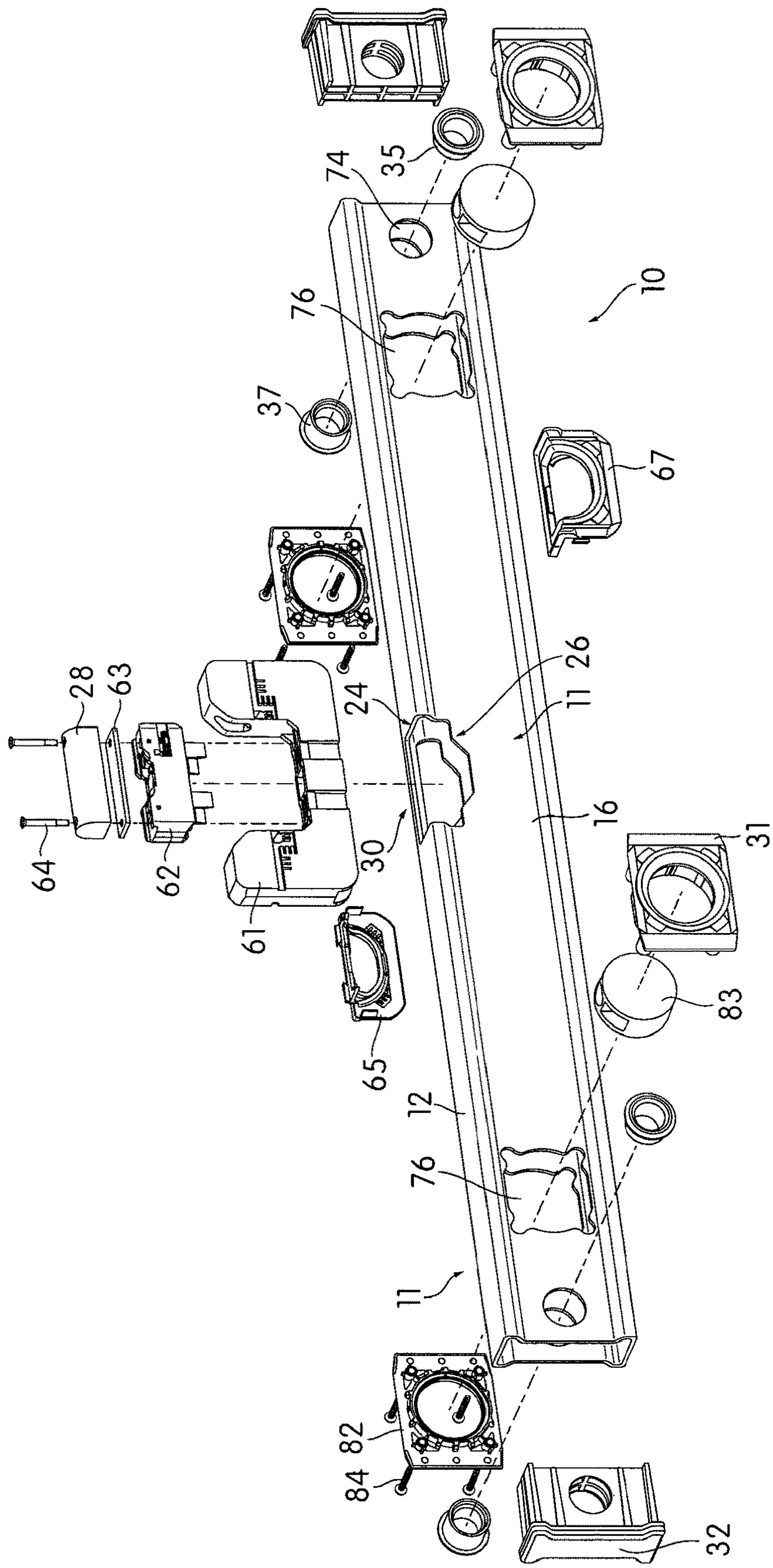
FIG. 3 is an exploded view of a level according to an embodiment of the invention.
Figure 4A:
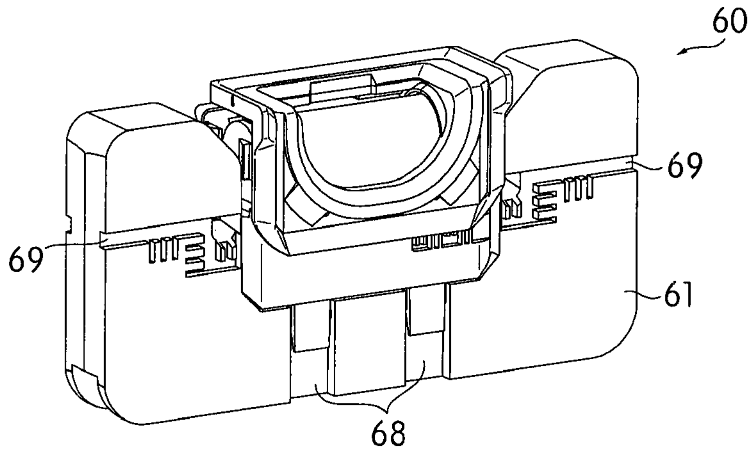
FIG. 4A is a perspective view of a vial assembly according to an embodiment of the invention.
Figure 4B:
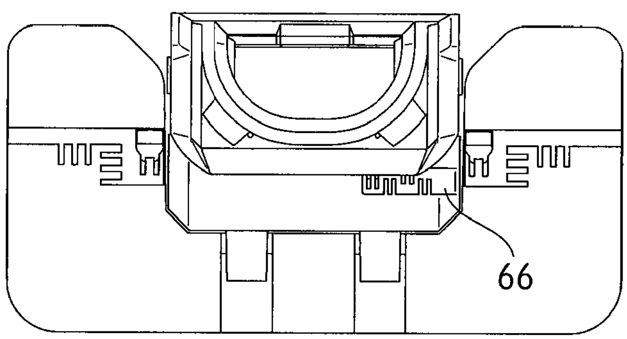
FIG. 4B is a side view of the vial assembly shown in FIG. 4A.
Figure 4C:
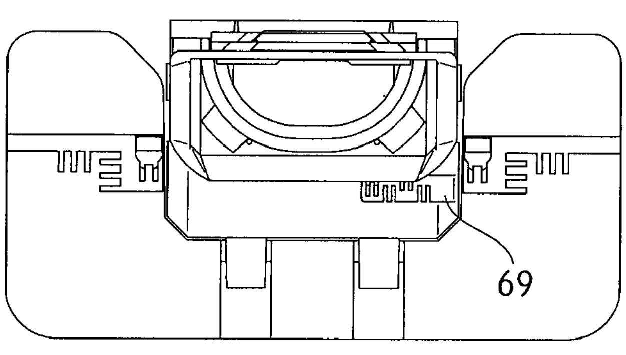
FIG. 4C is a side view of the opposite side of the vial assembly shown in FIG. 4B.
Figure 4D:
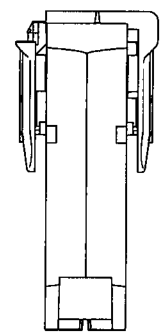
FIG. 4D is an end view of the vial assembly shown in FIG. 4A.
Figure 4E:
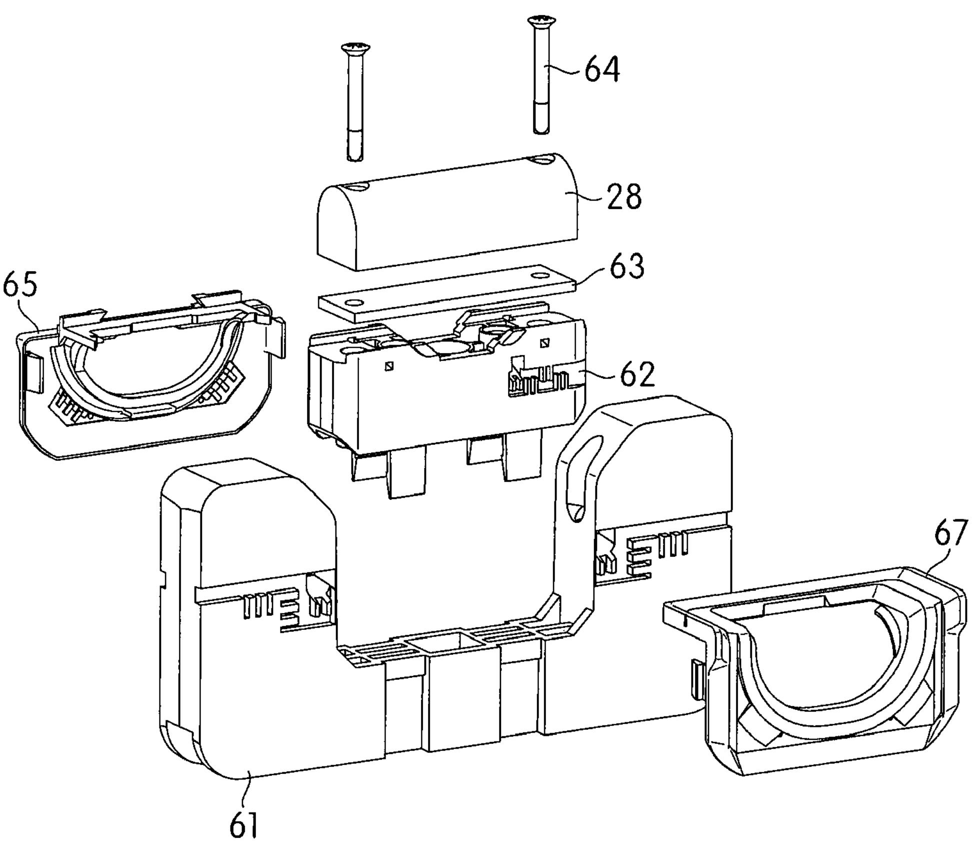
FIG. 4E is an exploded view of the vial assembly shown in FIG. 4A.
Figure 5A:
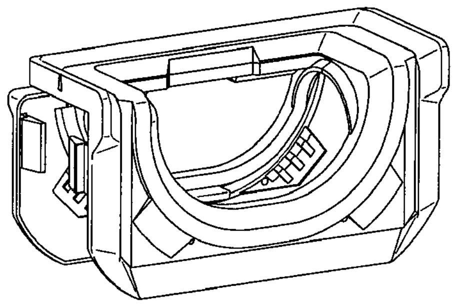
FIG. 5A is a perspective view of a vial cover used in a vial assembly according to an embodiment of the invention.
Figure 5B:
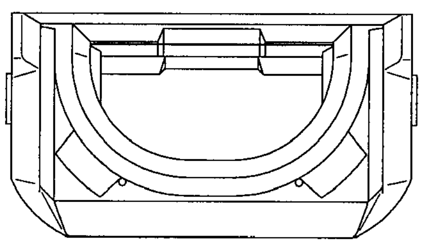
FIG. 5B is a side view of the vial cover shown in FIG. 5A.
Figure 5C:
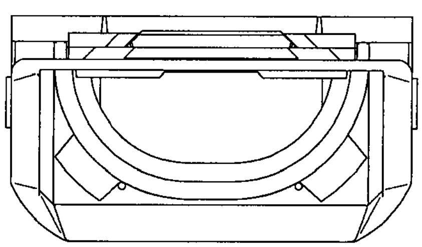
FIG. 5C is a side view of the opposite side of the vial cover shown in FIG. 5B.
Figure 5D:
FIG. 5D is an end view of the vial cover shown in FIG. 5A.
Figure 5E:
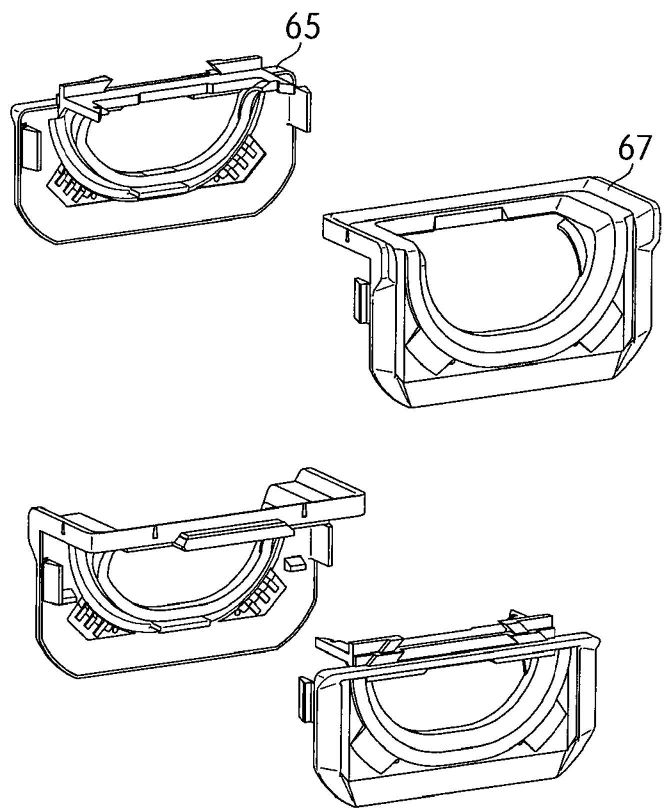
FIG. 5E is an exploded view of the vial cover shown in FIG. 5A.
Figure 6A:
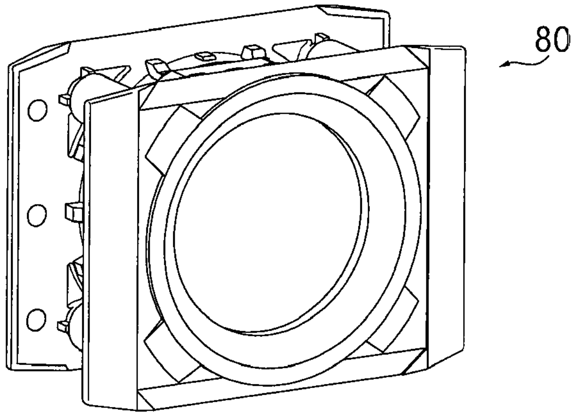
FIG. 6A is a perspective view of a vial assembly according to an embodiment of the invention.
Figure 6B:
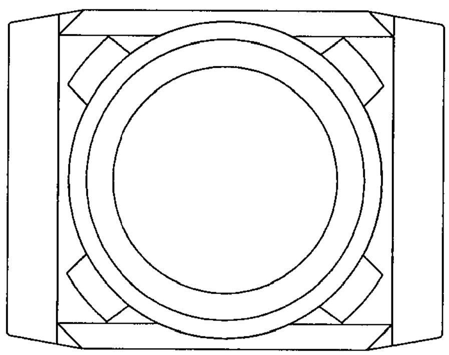
FIG. 6B is a side view of the vial assembly shown in FIG. 6A.
Figure 6C:
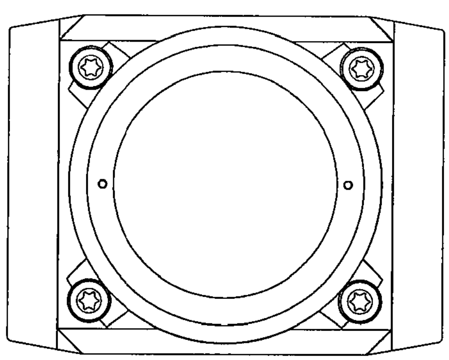
FIG. 6C is a side view of the opposite side of the vial assembly shown in FIG. 6B.
Figure 6D:
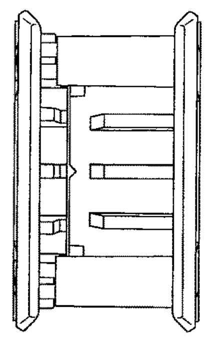
FIG. 6D is an end view of the vial assembly shown in FIG. 6A.
Figure 6E:
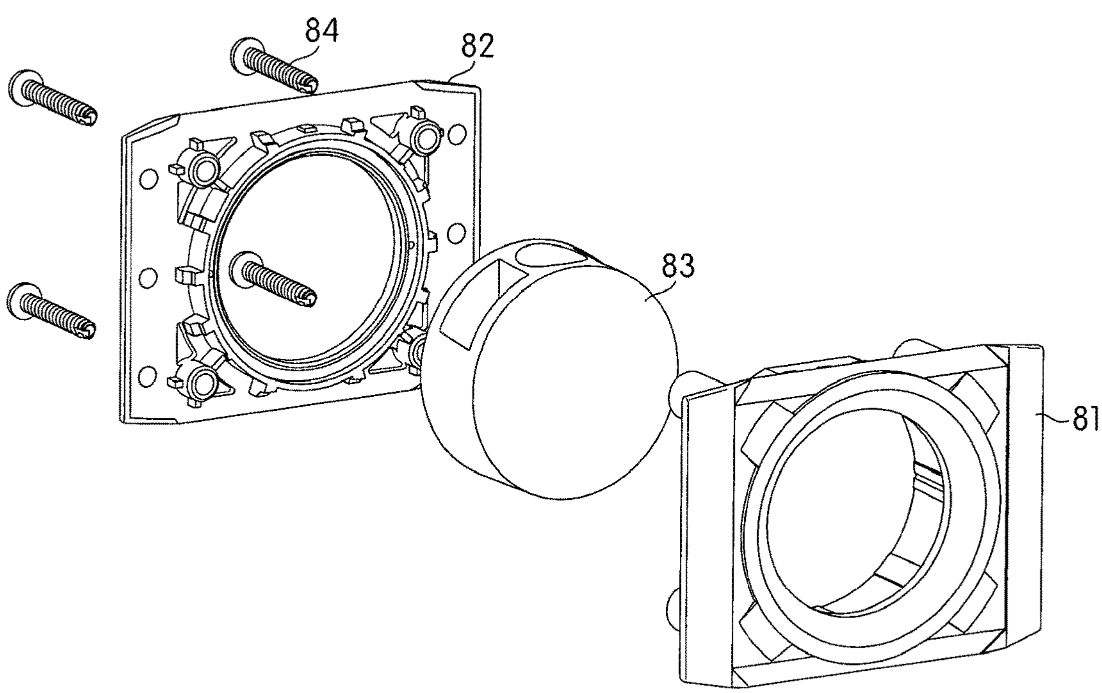
FIG. 6E is an exploded view of the vial assembly shown in FIG. 6A.

Turning to FIG. 3, an exploded view of a level 10 according to an embodiment of the invention is shown. Various openings may be cut into level body 11 to accommodate different components. In one embodiment, openings may be cut at a generally central location to house a horizontal level indicating vial assembly at that location within level body 11. The upper wall 12 of level body 11 has an opening 24 that is contiguous with a side opening 26 in the first side wall 16. The second side wall 18 has a side opening 30 that is not contiguous with the top opening 24 in the upper wall. Other suitable openings may be cut into level body 11 to accommodate the horizontal level indicating vial assembly, for example where opening 24 is not contiguous with side opening 26.

Substantially square openings 76 may be cut through both side walls 16, 18 to accommodate vial assemblies. Circular openings 74 cut through both side walls 16, 18 may be used by eyelet pieces 35, 37 to secure end caps 32. Other shapes and sizes for openings 74, 76 may be used.

Turning to FIGS. 4A-E, various views of a horizontal level indicating vial assembly 60 according to an embodiment are shown. Vial assembly 60 is constructed and arranged to secure a horizontal level indicating bubble vial 28 in an operative position. Vial assembly 60 includes vial carrier base 61, vial carrier 62, pad 63, vial cover pieces 65, 67, bubble vial 28, and screws 64. As discussed in greater detail below, when secured in an operative position inside level body 11, vial assembly 60 provides additional strength to the level 10.

In the embodiment shown, vial carrier base 61 is a substantially U-shaped piece. Vial carrier base 61 may be produced as a one piece component molded from a suitable plastic material, for example, high impact ABS. Other suitable material may be used, such as metal, to make vial carrier base 61. In one embodiment, the walls of vial carrier base include grooves 68, 69. Grooves 68, 69 in vial carrier base 61 provide voids or pockets wherein adhesives, such as epoxy adhesive, may be deposited. The grooves 68, 69 are filled with adhesive to secure vial assembly 60 in an operative position inside level body 11.

As shown, vial carrier base 61 includes several grooves 68, 69 of different shapes and sizes and at various locations. Grooves 69 on the upward extending legs of the U-shaped vial carrier base 61 may be formed in an irregular pattern. Grooves 69 may include large grooves with various smaller channels or grooves branching off the large grooves to facilitate in the attachment with the adhesive to the level body 11. Additional grooves such as grooves 68 may be formed on the lower base portion of the vial carrier base 61. The grooves 68 shown are substantially straight vertical cutouts on the base of the vial carrier base 61. Grooves 68, 69 are formed on both the front side and back side of the vial carrier base 61. Other suitably shaped, sized, and located grooves may be formed in vial carrier base 61. For example, deeper grooves may be used to contain a greater amount of adhesive. Grooves may be formed as part of the molding process in making the vial carrier base 61 or material may be cut out of the vial carrier base 61 to form the grooves.

Vial carrier 62 may be formed to fit into the inner portion of the U-shaped configuration of the vial carrier base 61. Vial carrier 62 may have snap action elements disposed on the bottom surface that secures onto vial carrier base 61. Vial carrier 62 may include groove 66 similar to grooves 68, 69 in vial carrier base 61. Groove 64 provide a void or pocket to contain adhesive. As discussed with grooves 68, 69, groove 64 may be formed with various shapes, sizes, and locations. For example, as shown, groove 64 comprises various small channels or grooves to facilitate in the attachment with the adhesive to the level body 11. Vial carrier 62 may be produced as a one piece component molded from a suitable plastic material, for example, high impact ABS. Other suitable material may be used, such as metal, to make vial carrier 62.

Bubble vial 28 may be secured onto vial carrier 62 with screws 64 or other suitable fixation devices. Screws 64 may be made of plastic, metal, or other suitable material. Pad 62 may be placed between bubble vial 28 and vial carrier 62 to cushion bubble vial 28. Pad 26 may be any suitably soft material, such as rubber. In one embodiment, pad 62 may be omitted.

In one embodiment, bubble vial 28 comprises a barrel shaped opening formed in a solid rectangular block of clear plastic material. In another embodiment, bubble vial 28 may have a rounded top surface (a cylindrical upper portion and rectangular block lower portion) in accordance with the teachings of U.S. Pat. No. 7,464,479, hereby incorporated by reference. In one embodiment, bubble vial 28 may be made in accordance with the teachings of U.S. patent application Ser. No. 14/107,908, filed Dec. 16, 2013, hereby incorporated by reference. It is contemplated that any type of level indicating vial may be used that is capable of providing accurate horizontal level indications.

FIGS. 5A-E show various views of a vial cover 69 comprising vial cover pieces 65, 67. Vial cover 69 may include a dove tail feature in the male vial cover piece 65 and the female vial cover piece 67. The dove tail feature allows the vial cover pieces 65, 67 to be aligned vertically and horizontally with respect to each other when fixed into place over bubble vial 28. Vial cover pieces 65, 67 may also be molded from a suitable plastic material, for example, high impact ABS. Other suitable material may be used, such as metal, to make vial cover pieces 65, 67.

FIGS. 6A-E show various views of vial assembly 80 according to an embodiment of the invention. In one embodiment, vial assembly 80 may be vial assemblies 70 and 72 shown in FIGS. 1A-D. Vial assembly 80 may be used for plumb determination or for determining whether a surface is oriented at 45 degrees (or any other suitable degree). A pair of substantially square cover pieces 81, 82 retains bubble vial 83 in an operative position between walls 16, 18 of level 10. The pair of cover pieces 81, 82 are moved axially toward one another within opening 76 into an operative position. Screws 84 secure cover pieces 81, 82. Cover pieces 81, 82 may be molded from a suitable plastic material, for example, high impact ABS. Other suitable material may be used, such as metal, to make cover pieces 81, 82.

In one embodiment, bubble vial 28 may be made in accordance with the teachings of U.S. patent application Ser. No. 14/107,908, filed Dec. 16, 2013, hereby incorporated by reference. It is contemplated that any type of level indicating vial may be used that is capable of providing accurate level indications.

Figure 7A:
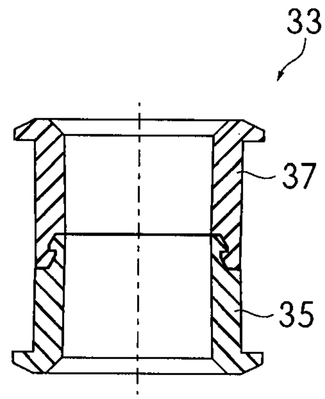
FIG. 7A is a cross sectional view of an eyelet assembly according to an embodiment of the invention.
Figure 7B:
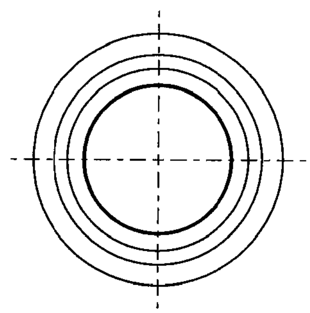
FIG. 7B is a top view of the eyelet assembly shown in FIG. 7A.
Figure 7C:
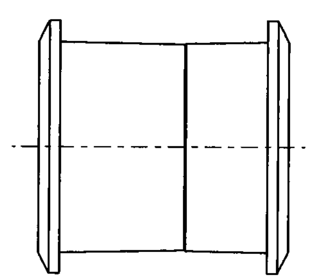
FIG. 7C is a side view of the eyelet assembly shown in FIG. 7A.

FIGS. 7A-C show various views of eyelet assembly 33 according to an embodiment of the invention. Eyelet assembly 33 may be used to secure end caps 32 through openings 74. Eyelet assembly 33 includes male eyelet piece 35 and female eyelet piece 37. Piece 35 secures onto piece 37 through an annular snap fit technique. Eyelet pieces 35, 37 may be molded from a suitable plastic material, for example, high impact ABS. Other suitable material may be used, such as metal, to make eyelet piece 35, 37.

Figures 8A, 8B, 8C:
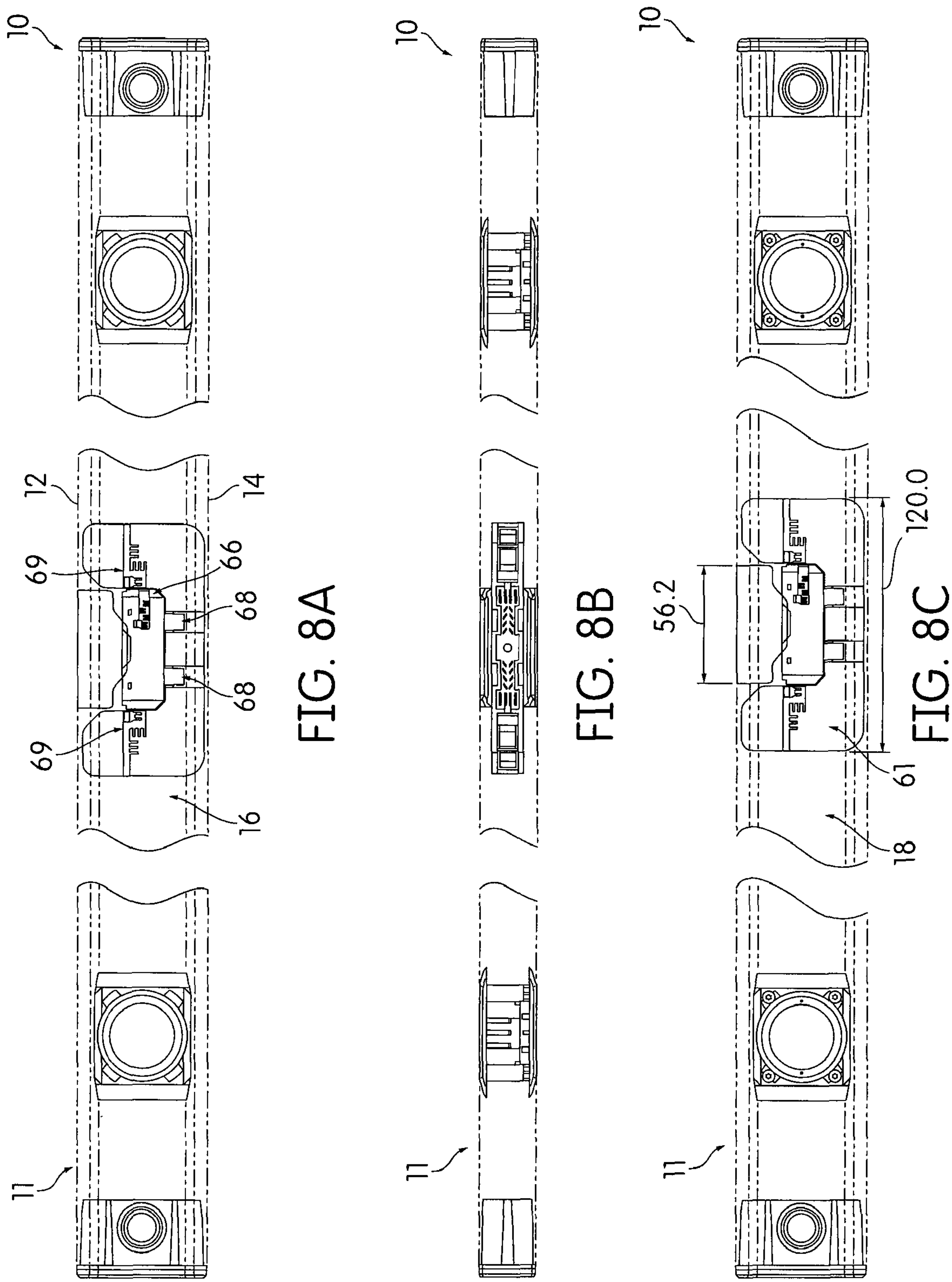
FIG. 8A is a side view of the level of FIG. 1A, with the level body shown in dashed lines to better review various components mounted thereto according to an embodiment of the invention.
FIG. 8B is a top view of the various components shown in FIG. 8A, with the level body shown in dashed lines.
FIG. 8C is a side view of the opposite side of the various components shown in FIG. 8A, with the level body shown in dashed lines.

FIGS. 8A-C show various components in level 10. Level body 11 is shown with dashed lines. As shown in FIG. 8A, vial carrier base 61 is wider than openings 24, 26. Vial carrier base 61 may be inserted into level body 10 by first sliding one leg of the U-shaped vial carrier base 61 through openings 24, 26 and then pushing the remaining portions of the vial carrier base 61 into the openings 24, 26. Alternatively, vial carrier base 61 may be slid into level body 11 through the ends and pushed into the center of level body 11. After vial carrier base 61 is positioned in level body 11, adhesive, for example epoxy adhesive, is applied to the vial carrier base 61 at grooves 64, 68, 69 to fix the carrier base 61 inside the level body 11. In one embodiment, the epoxy adhesive is SCOTCH-WELD Epoxy Adhesive 2216 B/A from 3M. Once the adhesive is set or cured, the remaining pieces of horizontal level indicating assembly 60 may be secured onto the vial carrier base 61. Vial carrier 62, pad 63, and bubble vial 28 are screwed onto vial carrier base 61 and vial cover pieces 65, 67 are snapped together through openings 26, 30.

Applicants have found that vial assembly 60 provides additional strength to a level 10 produced using the materials and methods described above. In particular, vial carrier base 61 acts an internal support structure.

Prior to cutting openings 24, 26, 30 in level body 11, the carbon fiber material run along the whole length of the level body 11 as continuous strands of fiber material and the fiber glass materials are a continuous sheet of glass fiber. Cutting openings 24, 26, 30 cause breaks in the carbon fiber material and the fiber glass materials, which weaken the level body 11. The openings 24, 26, 30 further produce stress points at the corners of the openings in level body 11. When installed in its operative position, vial assembly 60 provides support to level body 11.

As shown, vial assembly 60, and in particular vial carrier base 61 spans the width of openings 24, 26. When seated inside level body 11, the top side of the two legs in the U-shaped portion of vial carrier base 61 abuts the inside surface of the top wall 12 of level body 11 immediately beyond the opening 24 on the top wall 12. The bottom side of the longitudinal portion of vial carrier base abuts the inside surface of the bottom wall 14 of level body 11. The vial carrier base 61 is made with a thickness that is substantially the size of the space spanning the inner surface of side walls 16, 18 so that the front side and back side of vial carrier base 11 abuts the inner surface of side walls 16, 18. In this configuration, vial carrier base 61 provides additional support to the weakened portions of level body 11 at the corners where openings 24, 26, 30 are cut.

In the embodiment shown, the width of vial carrier base 61 is approximately twice the width of openings 24, 26 and the inside width of the U-shaped portion is approximately the width of openings 24, 26. As shown, openings 24, 26 are 56.2 mm wide and vial carrier base 61 is 120 mm wide. In one embodiment, vial carrier base is 120 mm wide, 58 mm high, 15 mm thick, and the distance between the two upstanding legs is 57 mm. The size of vial carrier base 61 may be varied depending on need.

Additional support may be provided by the adhesive used to secure vial assembly 60 inside level body 11. Adhesive may be dispensed into grooves 64, 68, 69 and any other voids between vial assembly 60 and the inside walls of level body 11. Once hardened or cured, the adhesive secures the vial assembly 60 and further solidifies level body 11. Any suitable adhesive may be used. An epoxy adhesive having a modified epoxy base and a modified amine accelerator may be used. In one embodiment, the epoxy adhesive is SCOTCH-WELD Epoxy Adhesive 2216 B/A from 3M.

In one embodiment, the level 10 is capable of withstanding a load test of a 200 pound load at the center of the level while the ends are supported on a platform without damage. The level 10 is capable of withstanding the load test on all four surfaces of the level. The level is also capable of withstanding a torsion test of twisting the ends of the level without damage.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A level comprising:

a level body; and at least one bubble vial mounted on the level body;

wherein the level body has a generally tubular configuration including a top wall and a bottom wall generally parallel to one another, and a pair of spaced side walls; a top opening in the level body that interrupts at least a portion of the top wall to accommodate the at least one bubble vial; and an internal support structure disposed within the tubular configuration of the level body and spanning longitudinally along the level body so as to be disposed on both sides of the top opening to provide structural support to the level body in the vicinity of the top opening.

2. The level of claim 1, wherein the internal support structure is formed of metal material.

3. The level of claim 1, wherein the internal support structure comprises a generally U-shaped configuration.

4. The level of claim 3, wherein the generally U-shaped configuration of the internal support structure is constructed and arranged to surround the at least one bubble vial.

5. The level of claim 1, wherein the internal support structure includes a base portion, a pair of legs extending upwardly from the base portion, and an opening disposed between the pair of upwardly extending legs, and wherein the opening of the internal support structure is constructed and arranged to receive the at least one bubble vial therein.

6. The level of claim 5, wherein, when the internal support structure is seated inside the level body, top surfaces of the pair of upwardly extending legs abut inside surfaces of the top wall of the level body immediately beyond the top opening, and bottom surface of the base portion abuts inside surface of the bottom wall of the level body.

7. The level of claim 5, wherein the internal support structure has a thickness that is substantially the size of a space spanning inner surfaces of the side walls of the level body such that front surface and back surface of the internal support structure abut the inner surfaces of side walls of the level body.

* * * * *